(12) United States Patent
Matsunaga

(10) Patent No.: US 10,665,107 B2
(45) Date of Patent: May 26, 2020

(54) MOVING OBJECT CONTROL APPARATUS AND METHOD OF CONTROLLING MOVING OBJECT

(71) Applicant: DENSO CORPORATION, Kariya, Aichi-pref. (JP)

(72) Inventor: Shogo Matsunaga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 38 days.

(21) Appl. No.: 16/062,542

(22) PCT Filed: Dec. 15, 2016

(86) PCT No.: PCT/JP2016/087452
§ 371 (c)(1),
(2) Date: Jun. 14, 2018

(87) PCT Pub. No.: WO2017/104773
PCT Pub. Date: Jun. 22, 2017

(65) Prior Publication Data
US 2018/0366001 A1 Dec. 20, 2018

(30) Foreign Application Priority Data
Dec. 17, 2015 (JP) .................................. 2015-246693

(51) Int. Cl.
*G08G 1/16* (2006.01)
*B60T 7/12* (2006.01)
(Continued)

(52) U.S. Cl.
CPC ................ *G08G 1/166* (2013.01); *B60T 7/12* (2013.01); *B60T 7/22* (2013.01); *B60T 8/00* (2013.01); *B60T 8/17* (2013.01); *B60W 50/14* (2013.01); *G01S 13/589* (2013.01); *G01S 13/931* (2013.01); *G06K 9/00805* (2013.01);
(Continued)

(58) Field of Classification Search
CPC . G08G 1/166; B60T 7/12; B60T 7/20; B60W 50/14; B60W 2050/143; G06K 9/00805
See application file for complete search history.

(56) References Cited

U.S. PATENT DOCUMENTS

2015/0294568 A1 10/2015 Shibata
2017/0327112 A1* 11/2017 Yokoyama ........... G05D 1/0223

FOREIGN PATENT DOCUMENTS

JP 2000-348299 A 12/2000
JP 2007-241898 A 9/2007
(Continued)

*Primary Examiner* — Aaron L Troost
(74) *Attorney, Agent, or Firm* — Knobbe, Martens, Olson & Bear, LLP

(57) ABSTRACT

A moving object control apparatus activates a safety device that avoids a collision between a moving object and an object present ahead of the moving object in its moving direction or reduces damage from a collision when the moving object is likely to collide with the object. The moving object control apparatus includes a restricting unit that restricts activation of the safety device based on angle information including at least one of an angle of a moving direction of the object relative to the moving direction of the moving object and a change in angle per time.

8 Claims, 12 Drawing Sheets

(51) Int. Cl.
  *B60T 8/00*       (2006.01)
  *G01S 13/58*      (2006.01)
  *G06K 9/62*       (2006.01)
  *G01S 13/931*     (2020.01)
  *B60T 7/22*       (2006.01)
  *B60T 8/17*       (2006.01)
  *G06K 9/46*       (2006.01)
  *B60W 50/14*      (2020.01)
  *G06K 9/00*       (2006.01)
  *G06T 7/20*       (2017.01)
  *G01S 13/86*      (2006.01)
  *G01S 13/44*      (2006.01)

(52) U.S. Cl.
  CPC ......... *G06K 9/4604* (2013.01); *G06K 9/6202* (2013.01); *G06T 7/20* (2013.01); *B60T 2201/022* (2013.01); *B60W 2050/143* (2013.01); *G01S 13/4454* (2013.01); *G01S 13/867* (2013.01); *G01S 2013/93271* (2020.01)

(56) References Cited

FOREIGN PATENT DOCUMENTS

| | | | |
|---|---|---|---|
| JP | 2010208583 A | * | 9/2010 |
| JP | 2012-48460 A | | 3/2012 |
| JP | 2012-146146 | | 8/2012 |
| JP | 2015-203948 A | | 11/2015 |

* cited by examiner

FIG.1
(a)
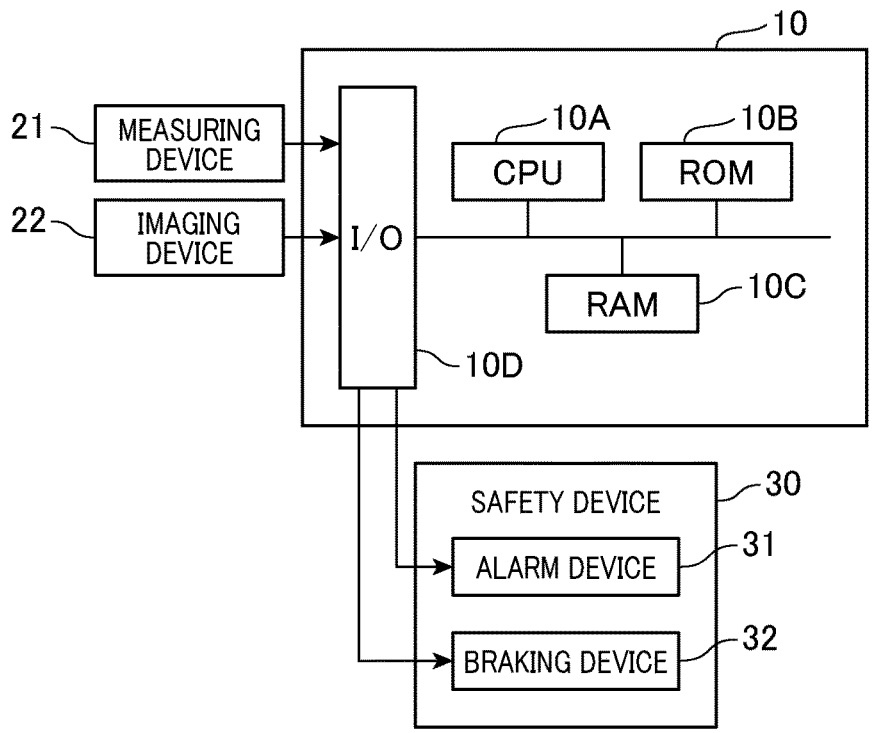
(b)
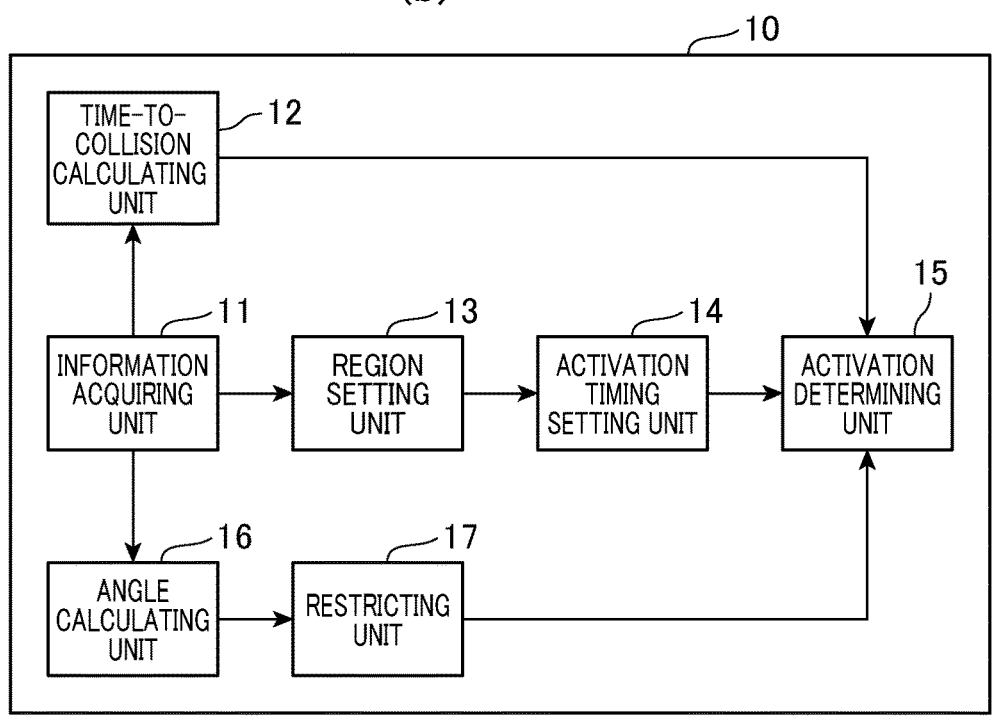

FIG.7
(a)
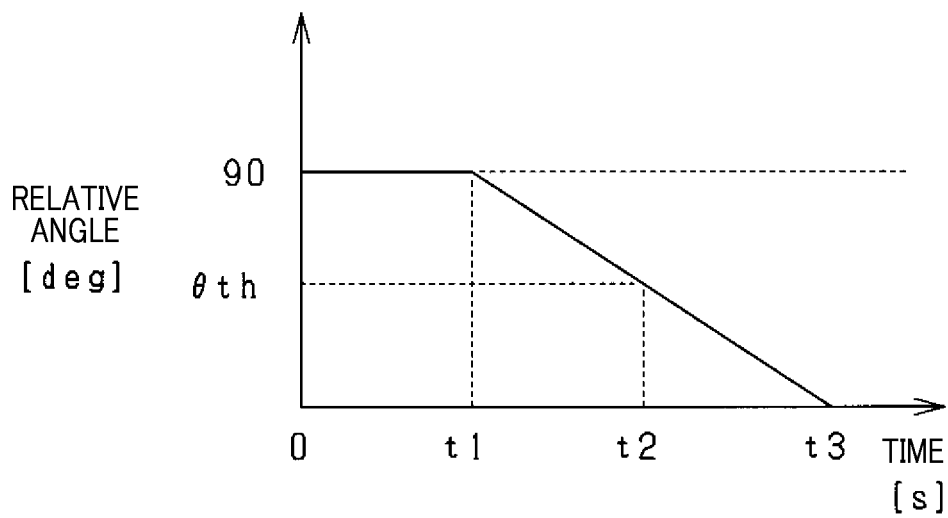
(b)
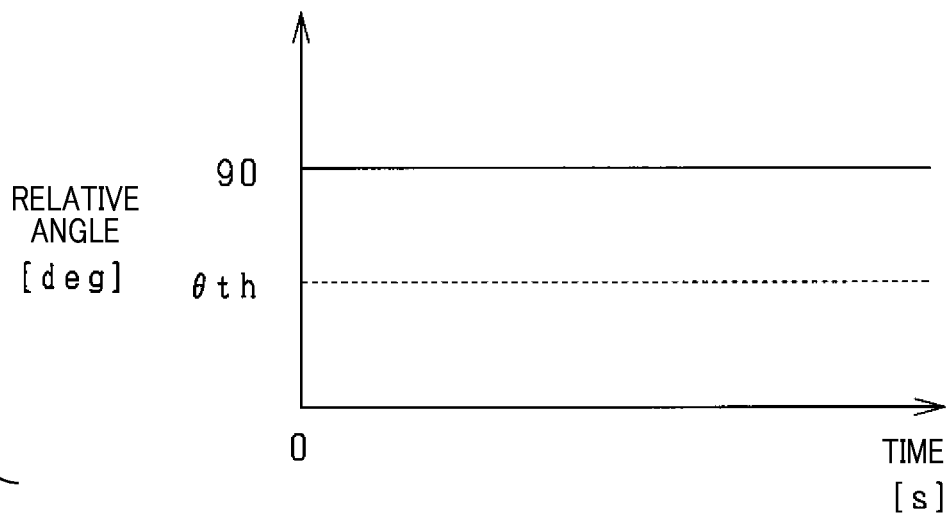

FIG.8
(a)
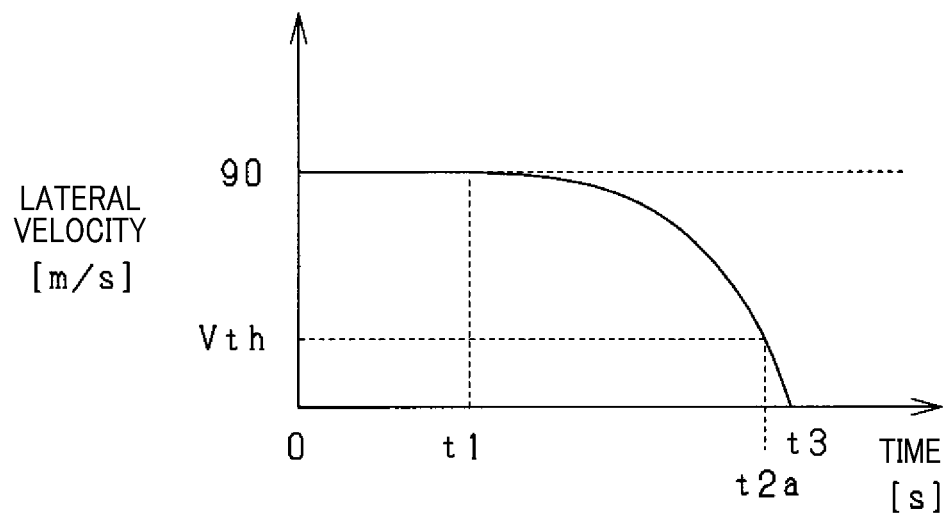
(b)
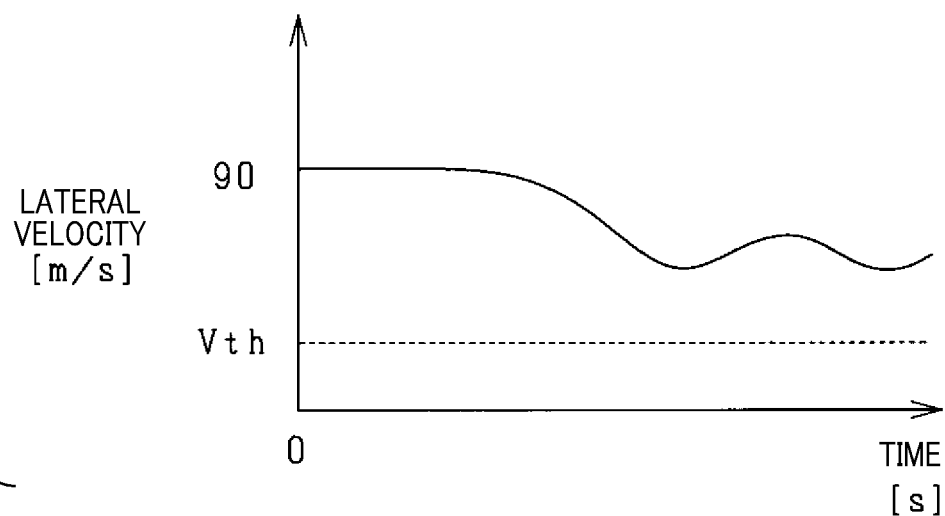

FIG.13
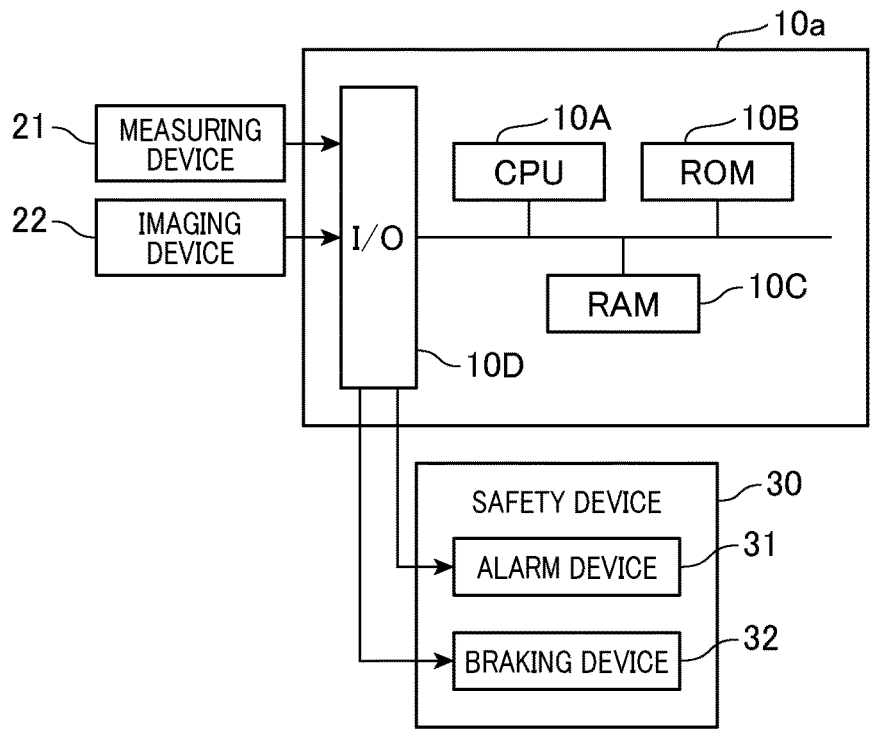
(a)
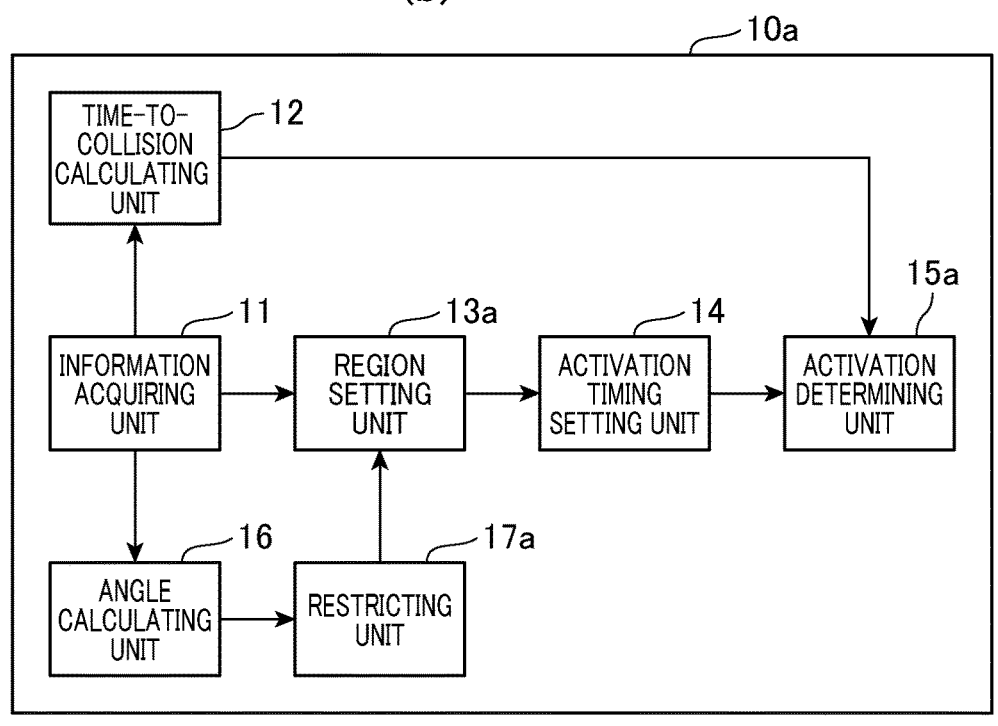
(b)

MOVING OBJECT CONTROL APPARATUS AND METHOD OF CONTROLLING MOVING OBJECT

CROSS-REFERENCE TO RELATED APPLICATION

The present application is based on Japanese Patent Application No. 2015-246693 filed on Dec. 17, 2015, the contents of which are incorporated herein by reference.

BACKGROUND

Technical Field

The present disclosure relates to a moving object control apparatus and a method of controlling a moving object for activating a safety device in order to avoid a collision between a moving object and an object.

Background Art

Conventionally, a pre-crash safety (PCS) system detects the position of an object located ahead of a vehicle (moving object) in its moving direction, and reduces or prevents damage from a collision with the object such other vehicles, pedestrians, or road structures. The PCS provides a region having a predetermined width ahead of the vehicle in its moving direction, and recognizes an object located within the region as an object that is likely to collide with the vehicle. The PCS calculates time to collision (TTC), which is an estimate of the time remaining until the vehicle collides with the object, based on the relative distance and relative velocity/acceleration between the vehicle and the object. Based on the calculated TTC, the PCS system uses an alarm device to notify the driver of the vehicle that the vehicle is approaching the object, or activates a braking device in the vehicle.

As a technique related to the PCS, PTL 1 discloses a driving support device. The driving support device described in PTL 1 detects the speed of an object that crosses the moving direction of the vehicle, and sets a large width for a region provided ahead of the vehicle in its moving direction based on the speed. Once the object enters the region, the driving support device determines that a condition for activating the safety device is satisfied.

CITATION LIST

Patent Literature

PTL 1: JP 2012-48460 A

An object moving at the orthogonal angle relative to the moving direction of the vehicle may turn right or left before entering the course of the vehicle to move in the same direction as or opposite direction of the moving direction of the vehicle. If the object turns in the same direction as the vehicle, activation of the safety device needs to be restricted since the vehicle is unlikely to collide with the object. While the object is turning, a lateral velocity that is the relative velocity in the direction orthogonal to the moving direction of the vehicle decreases accordingly. Therefore, whether the object is turning can be determined by acquiring the lateral velocity.

However, the object may enter the course of the vehicle while reducing speed. Therefore, in order to prevent inactivation of the safety device against such an object, a threshold value for the lateral velocity for determining whether the object is turning needs to be sufficiently small. However, a sufficiently small threshold value for the lateral velocity increases the time required before the lateral velocity of the turning object falls below the threshold value. Upon the occurrence of an error in detecting the lateral velocity, even the lateral velocity of the turning object might exceed the threshold value. As a result, unnecessary activation of the safety device may occur.

SUMMARY

The main object of the present disclosure is to provide a moving object control apparatus and a method of controlling a moving object capable of activating a safety device appropriately.

A first aspect of the present disclosure is a moving object control apparatus that activates, as a safety device, a device that avoids a collision between a moving object and an object present ahead of the moving object in its moving direction or reduces damage from a collision when the moving object is likely to collide with the object, and the moving object control apparatus includes a restricting unit that restricts activation of the safety device based on angle information including at least one of an angle of a moving direction of the object relative to the moving direction of the moving object and a change in the angle per time.

Once the relation indicating the angle between the moving direction of the moving object such as a vehicle and the moving direction of the object is found, it can be determined whether the object is highly likely to cross the course of the moving object. Once a change in the angle between the moving direction of the moving object and the moving direction of the object per time is found, the tendency of change in the moving direction of the object is also found. In the above configuration, at least one of the angle of the moving direction of the object relative to the moving direction of the moving object and the change in the angle per time is used for determining whether to restrict activation of the safety device. Therefore, the safety device can be activated appropriately in accordance with the moving direction of the object.

BRIEF DESCRIPTION OF DRAWINGS

The above and other objects, features, and advantages of the present disclosure will be further clarified in the following detailed description with reference to the accompanying drawings. In the accompanying drawings:

FIG. 1, in its parts (a) and (b), shows a block diagram illustrating the hardware of a vehicle control apparatus according to the present embodiment, and a functional block diagram of the vehicle control apparatus.

FIG. 7 is a timing diagram illustrating temporal variations in relative angle.

FIG. 8 is a diagram illustrating comparative example of providing a threshold value for the lateral velocity.

FIG. 13, in its parts (a) and (b), shows a block diagram illustrating the hardware of a vehicle control apparatus according to a fourth embodiment, and a functional block diagram of the vehicle control apparatus.

DESCRIPTION OF EMBODIMENTS

Figure 2:
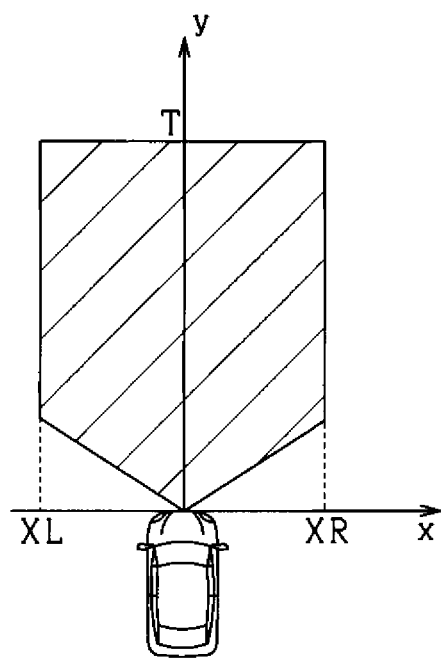
FIG. 2 is a diagram illustrating an activation region.

Hereinafter, embodiments will be described with reference to the drawings. The components identical with or similar to those in the embodiments described below are given the same reference sign, for the sake of omitting unnecessary explanation.

First Embodiment

A moving object control apparatus (hereinafter referred to as a "vehicle control apparatus") 10 according to the present embodiment functions as a PCS system mounted to a vehicle (moving object) to detect an object present around the vehicle such as ahead of the vehicle in its moving direction and perform control in order to avoid a collision with the object or reduce damage from a collision.

Referring to FIG. 1(a), the vehicle control apparatus 10 is a computer including a central processing unit (CPU) 10A, a read only memory (ROM) 10B, a random access memory (RAM) 10C, an input/output (I/O) interface 10D, and the like. The vehicle control apparatus 10 realizes these functions when the CPU 10A executes programs installed on the ROM 10B. The ROM 10B corresponds to a non-transitory tangible recording medium (non-transitory computer-readable recording medium). In addition to the ROM 10B, examples of recording media include computer-readable electronic media such as a digital versatile disk read only memory (DVD-ROM), a compact disc read only memory (CD-ROM), and a hard disk.

A measuring device 21 and an imaging device 22 are connected to the vehicle control apparatus 10 as sensor devices that input various types of detection information.

The measuring device 21 is, for example, a well-known millimeter-wave radar that transmits high-frequency signals in a millimeter-waveband, and is attached to the front end of a vehicle so as to detect the position of an object within a detection range, i.e., a region within a predetermined detection angle in which objects are detectable. Specifically, the measuring device 21 transmits probing waves at predetermined intervals, and receives reflected waves through a plurality of antennas. The distance to the object is calculated using the time at which a probing wave is transmitted and the time at which a reflected wave is received. The measuring device 21 also calculates relative velocity using the Doppler-shifted frequency of the reflected wave reflected by the object. In addition, the measuring device 21 calculates the azimuth direction of the object using the phase difference between the reflected waves received by the plurality of antennas. If the position and azimuth direction of the object can be calculated, the position of the object relative to the vehicle can be specified. Note that the measuring device 21 transmits probing waves, receives reflected waves, calculates reflection positions and relative velocities, and transmits the calculated reflection positions and relative velocities to the vehicle control apparatus 10 as first detection information at predetermined intervals.

The imaging device 22 is, for example, a monocular imaging device such as a charge-coupled device (CCD) camera, a complementary metal-oxide semiconductor (CMOS) image sensor, and a near-infrared camera. The imaging device 22 is attached to the vehicle at a predetermined height in the width center thereof, and captures, from a bird's eye viewpoint, a region extending ahead of the vehicle over a predetermined angle. The imaging device 22 extracts a feature point indicating the presence of an object from the captured image. Specifically, the imaging device 22 extracts edge points based on information on the luminance of the captured image, and subjects the extracted edge points to the Hough transform. In the Hough transform, for example, a point on a straight line formed by a plurality of aligned edge points or a point at which straight lines cross at right angles is extracted as a feature point. Note that the imaging device 22 captures images, extracts feature points, and transmits the results of extracting feature points to the vehicle control apparatus 10 as second detection information at the same intervals as the measuring device 21 or different intervals.

The vehicle includes an alarm device 31 and a braking device 32 as a safety device 30 that is driven by a control command from the vehicle control apparatus 10.

The alarm device 31 is a speaker and a display installed in the interior of the vehicle. If the vehicle control apparatus 10 determines that the possibility of a collision with an obstruction has increased, the alarm device 31 outputs a warning sound, a warning message, or the like to notify the driver of a collision hazard in response to a control command from the vehicle control apparatus 10.

The braking device 32 applies brakes on the vehicle. If the vehicle control apparatus 10 determines that the possibility of a collision with an obstruction has increased, the braking device 32 is activated in response to a control command from the vehicle control apparatus 10. Specifically, the braking device 32 increases the braking force relative to a brake operation by the driver (brake assist function) or automatically applies the brakes if no brake operation is performed by the driver (automatic brake function).

Referring to FIG. 1(b), an information acquiring unit 11 acquires the first detection information from the measuring device 21, and acquires the second detection information from the imaging device 22. Then, if a first position that is a position obtained from the first detection information and a second position that is a feature point obtained from the second detection information are close to each other, the information acquiring unit 11 regards the first position and the second position as being based on the same object, and correlates these positions with each other. If the second position is located near the first position, there is a strong possibility that the object is actually present at the first position. The state in which the position of an object is accurately obtained by the measuring device 21 and the imaging device 22 is referred to as a fusion state. The object determined to be in the fusion state is subjected to a determination as to whether the object has been continuously in the fusion state with reference to the history of detection. Then, if the object is determined to have been continuously in the fusion state, the presence of the object at that position is finally determined. If the object in the fusion state is put into a non-detection state, the object is treated as being present at the past position for a predetermined period of time with reference to the history of detection.

The second detection information of the object determined to be in the fusion state is subjected to pattern matching using patterns prepared in advance. Then, the object is correlated with a type. Examples of types of objects include automobiles, motorcycles, bicycles, pedestrians, and various road structures. Note that motorcycles and bicycles may be grouped as two-wheeled vehicles.

Next, the information acquiring unit 11 correlates each object with the position and velocity relative to the vehicle. As the relative position, a lateral position indicating the relative distance in the orthogonal angle direction relative to the moving direction of the vehicle and a longitudinal position that is the relative position with respect to the moving direction of the vehicle are obtained. Then, based on the relative position and relative velocity, a lateral velocity that is the relative velocity with respect to the direction orthogonal to the moving direction of the vehicle and a longitudinal velocity that is the relative velocity with respect to the moving direction of the vehicle are calculated. The lateral velocity as used herein is considered a value indicating information about the object, and thus can be referred to as an object information value.

A time to collision calculating unit 12 calculates the time to collision, which is the time remaining until the longitudinal position of an object indicating the relative distance between the vehicle and the object reaches zero. Specifically, the longitudinal position of the object is divided by the longitudinal velocity that is the relative velocity between the vehicle and the object, and the obtained time is set as the time to collision. In this case, if the longitudinal velocity is zero or if the longitudinal velocity has a negative value (if the vehicle and the object move away from each other), the longitudinal position is not reduced, and thus the time to collision is not calculated. In addition to the relative distance and relative velocity, relative acceleration may be used for calculating the time to collision on the assumption that the object moves with a constant acceleration relative to the vehicle. In this case, even when the relative velocity between the vehicle and the object has a negative value (even when the vehicle and the object move away from each other at the time of calculation), the time to collision is calculated as long as the relative acceleration has a positive value (as long as the relative velocity changes to the positive side).

A region setting unit 13 sets an activation region having a predetermined width in the lateral direction orthogonal to the moving direction of the vehicle. The activation region as used herein is a region for determining whether the lateral position of the object is where the safety device 30 should be activated. Specifically, if the lateral position of the object is within the activation region, it is determined that one condition for activating the safety device 30 is satisfied. The activation region is set such that the width of the activation region increases as the lateral velocity of the object increases. This is because even when the object is not located on the course of the vehicle, the safety device 30 needs to be activated more and more readily as the lateral velocity of the object increases since the possibility that the object enters the course of the vehicle increases and the possibility that the driver can recognize the object decreases accordingly.

Note that activation regions having different widths or the same width may be applied to the respective functions of the safety device 30. For example, the activation region set for the alarm device 31 has the largest width. This is because if the driver becomes aware of the danger of a collision by the alarm device 31 and performs an operation to avoid a collision, the vehicle control apparatus 10 does not have to give a control command to the braking device 32 to avoid a collision.

An activation timing setting unit 14 sets the activation timing for the safety device 30. The activation timing is compared with the above-mentioned time to collision. If the position of the object is within the activation region, and if the collision prediction time is equal to or less than the activation timing, the safety device 30 is activated. In other words, the larger the set activation timing is, the earlier the safety device 30 is activated even when the time to collision is long.

Different activation timings are set for the respective functions of the safety device 30. Specifically, the largest activation timing is set for the alarm device 31. This is because if the driver becomes aware of the danger of a collision by the alarm device 31 and depresses the brake pedal, the vehicle control apparatus 10 does not have to give a control command to the braking device 32 to avoid a collision. Note that separate activation timings are set for the brake assist and automatic brake functions of the braking device 32. These activation timings may be the same or different.

The activation region and activation timing will be described using FIG. 2. In FIG. 2, the moving direction of a vehicle 50 is represented by the vertical axis (y-axis), and the direction orthogonal to the vertical axis is represented by the horizontal axis (x-axis). The activation region has a predetermined width in the x-axis direction, and a right width XR and a left width XL respectively indicating the widths of the activation region in the right and left directions are determined in advance for each type of object. Since the activation timing T is determined in the y-axis direction, and the value obtained by multiplying the activation timing by the relative velocity (longitudinal velocity) between the vehicle 50 and an object indicates a position, the depth of the activation region depends on the activation timing. The activation timing is also set in advance for each type of object. Note that the activation region is provided along the shape of a road on which the vehicle 50 runs. Specifically, in a case where the vehicle travels in a curved section of a road, both ends of the activation region are set parallel with the shape of the road.

The activation region set by the region setting unit 13 and the activation timing set by the activation timing setting unit 14 are input to an activation determining unit 15. The activation determining unit 15 determines whether the lateral position of the object is within the activation region. If the lateral position of the object is within the activation region, the activation determining unit 15 determines that one condition for activating the safety device 30 is satisfied. Similarly, the activation determining unit 15 determines whether the time to collision is equal to or less than the activation timing. If the time to collision is equal to or less than the activation timing, the activation determining unit 15 determines that one condition for activating the safety device 30 is satisfied. Then, if the activation determining unit 15 determines that both the conditions for activating the safety device 30 are satisfied, the activation determining unit 15 transmits an activation instruction to the safety device 30 to cause the safety device 30 to execute the corresponding function.

Figure 3:
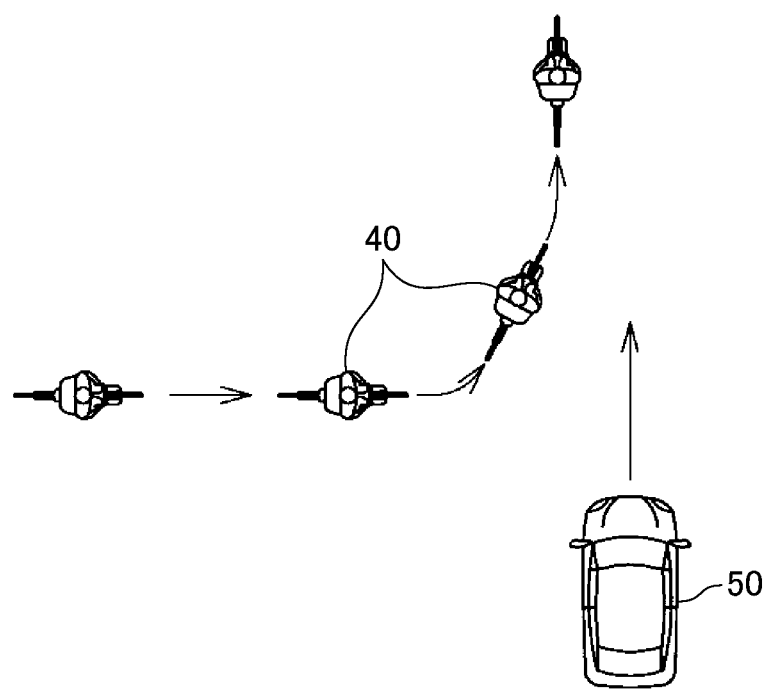
FIG. 3 is a diagram illustrating an example in which an object turns immediately before entering the course of a vehicle.

The conditions for activating the safety device 30 need to be set appropriately so as to deal with a situation where the speed of an object moving at the orthogonal angle relative to the moving direction of the vehicle changes during the process of setting the activation region and activating the safety device 30 based on the activation region. Specifically, the conditions for activating the safety device 30 need to be set such that inactivation and unnecessary activation can be suppressed. As used herein, inactivation means that the safety device 30 is not activated even though the safety device 30 needs to be activated, and unnecessary activation means that the safety device 30 is activated even though the safety device 30 does not need to be activated. More specifically, as shown in FIG. 3, assuming that an object 40 moving from the forward left side of the vehicle 50 at the orthogonal angle relative to the moving direction of the vehicle 50 turns left before entering the course of the vehicle 50, activation of the safety device 30 against the object 40 is unnecessary activation. In consideration of the fact that the lateral velocity decreases as the object 40 turns left, a possible solution for preventing unnecessary activation includes setting a threshold value for the lateral velocity of the object 40 so that the safety device 30 is not activated when the lateral velocity of the object 40 falls below the threshold value.

However, the object 40 moving at the orthogonal angle relative to the moving direction of the vehicle 50 may cross the course of the vehicle 50 while reducing the speed, and a value smaller than the actual lateral velocity might be detected due to an error in detecting the lateral velocity. Therefore, whether inactivation of the safety device 30 can occur even when the object 40 is about to enter the course of the vehicle 50 depends on the threshold value set for the lateral velocity, which is why the threshold value needs to be sufficiently small. However, if the threshold value is sufficiently small, the lateral velocity of the turning-left object 40 does not fall below the threshold value until the moving direction of the object 40 becomes substantially parallel to the moving direction of the vehicle 50, in other words, the lateral velocity of the turning-left object 40 falls below the threshold value immediately before the object 40 finishes turning left. Thus, unnecessary activation of the safety device 30 can occur while the object 40 is turning left.

In this regard, in the present embodiment, in order to suppress both inactivation and unnecessary activation of the safety device 30, an angle acquiring unit 16 acquires the relative angle between the moving direction of the vehicle 50 and the moving direction of the object 40, and determines whether the object 40 is turning left using the acquired relative angle.

The angle acquiring unit 16 acquires, as angle information, the angle of the moving direction of the object 40 relative to the moving direction of the vehicle 50 based on an image of the object 40 acquired from the imaging device 22. Specifically, one or more template images are stored in advance in association with each angle representing the posture of the object 40 relative to the vehicle 50 (posture angle). Then, the template images and the image of the object 40 are subjected to template matching, and the posture angle correlated with the most similar template image is set as the relative angle between the moving direction of the vehicle 50 and the moving direction of the object 40. Note that the value of the relative angle can be referred to as an angle.

Figure 4:
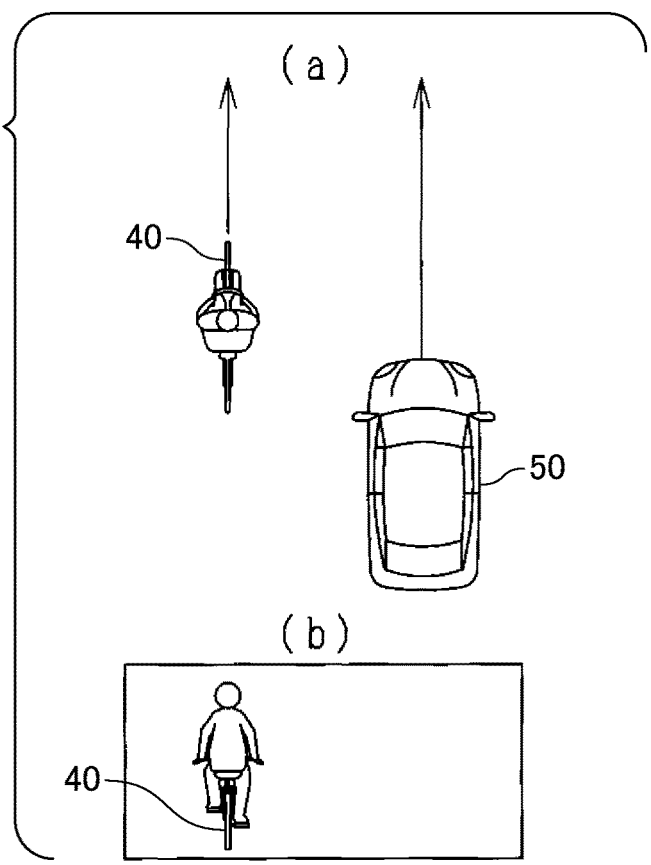
FIG. 4 is a diagram illustrating a relative angle of 0° and the corresponding shape of the object.

As shown in FIG. 4(a), when the moving direction of the vehicle 50 and the moving direction of the object 40 are the same, the relative angle θ is defined as 0° since the moving directions do not cross each other. In this case, as shown in FIG. 4(b), the image of the object 40 acquired from the imaging device 22 is a rear view of the object 40.

Figure 5:
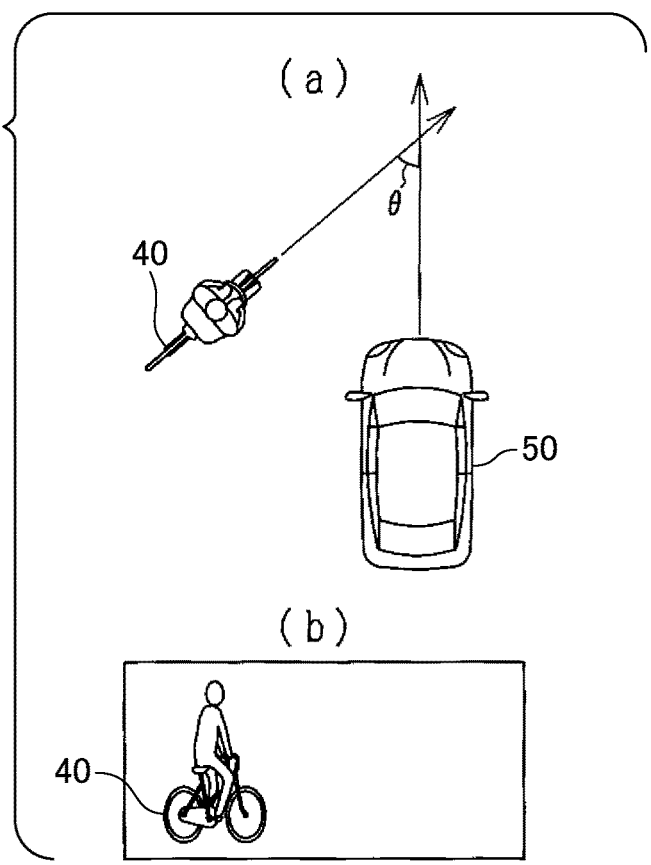
FIG. 5 is a diagram illustrating a relative angle of 45° and the corresponding shape of the object.

FIG. 5(a) is a diagram illustrating an example in which the object 40 advances at an angle to the moving direction of the vehicle 50, and the relative angle θ is 45°. In this case, as shown in FIG. 5(b), the image of the object 40 acquired from the imaging device 22 is an oblique rear view of the object 40.

Figure 6:
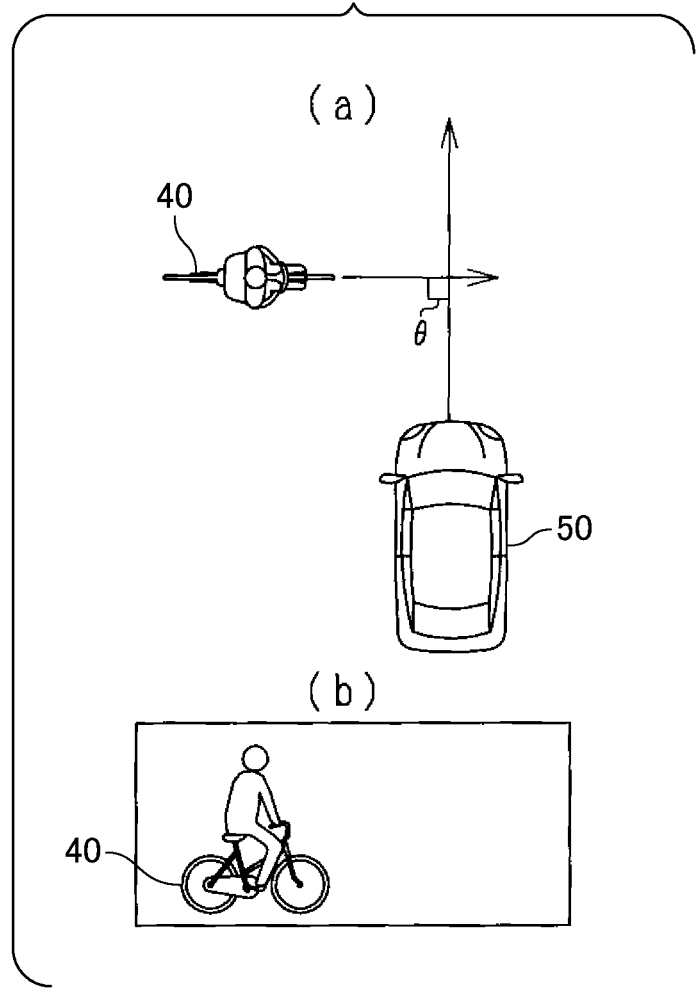
FIG. 6 is a diagram illustrating a relative angle of 90° and the corresponding shape of the object.

FIG. 6(a) is a diagram illustrating an example in which the object 40 moves at the orthogonal angle relative to the moving direction of the vehicle 50, and the relative angle θ is 90°. In this case, as shown in FIG. 6(b), the image of the object 40 acquired from the imaging device 22 is a side view of the object 40.

In other words, as shown in FIGS. 4(b), 5(b), and 6(b), captured images vary according to the relative angle between the moving direction of the vehicle 50 and the moving direction of the object 40. The angle acquiring unit 16 uses this feature to obtain the relative angle through template matching. In this case, the relative angle between the moving direction of the vehicle 50 and the moving direction of the object 40 is obtained based on the posture angle of the object 40 relative to the vehicle 50.

Assuming that the object 40 is a bicycle, template images may be provided for its rider or the bicycle itself, or the rider and bicycle may be grouped in one template image. Template images are provided for predetermined angles. At this time, template images may be provided at equal or unequal relative-angle intervals. In this manner, template images are provided for the predetermined angles and correlated with the relative angles. Therefore, assuming that the actual relative angle is 35°, for example, it is highly possible that an image of the object is most similar to the template image for 30°, and it is most likely that the relative angle is considered 30°.

After the relative angle is obtained by the angle acquiring unit 16 in this manner, a restricting unit 17 compares the relative angle with an angle threshold value θth. The angle threshold value θth only needs to be larger than 0° and smaller than 90°, and is preferably in the range of about 30° to 45°. If the relative angle is smaller than the angle threshold value θth, there is a strong possibility that the object is turning left. Therefore, activation of the safety device 30 is prohibited. Specifically, even when the lateral position of the object is within the activation region, and the time to collision is equal to or less than the activation timing, the safety device 30 is not activated. The restricting unit 17 then inputs the result of determining whether to prohibit activation of the safety device 30 to the activation determining unit 15.

A timing diagram for the case where the vehicle control apparatus 10 according to the present embodiment performs the above control is shown in FIG. 7. FIG. 7(a) indicates that the object moving at the orthogonal angle relative to the moving direction of the vehicle turns left, so that the moving direction of the vehicle agrees with the moving direction of the object. The object starts to turn left at time t1, and the relative angle falls to or below the angle threshold value θth at time t2. Thus, activation of the safety device 30 is prohibited at time t2, and unnecessary activation of the safety device 30 can be prevented. The object continues turning left, and the relative angle reaches 0° at time t3, which means that the vehicle and the object travel at the same angle. FIG. 7(b) is a timing diagram for the case where the object moving at the orthogonal angle relative to the moving direction of the vehicle continues moving straight, so that the object enters the course of the vehicle. Since the relative angle is constant regardless of the lateral velocity of the object, the relative angle never falls to or below the threshold value. Therefore, inactivation of the safety device 30 can be prevented.

An example of providing a threshold value not for the relative angle but for the lateral velocity is shown in FIG. 8 as comparative example. FIG. 8(a) indicates that the object moving at the orthogonal angle relative to the moving direction of the vehicle turns left, and FIG. 8(b) indicates that the object moving at the orthogonal angle relative to the moving direction of the vehicle enters the course of the vehicle while increasing and reducing the speed repeatedly. In order to activate the safety device 30 even when the object behaves as shown in FIG. 8(b), a velocity threshold value Vth for the lateral velocity needs to be sufficiently small. Therefore, as shown in FIG. 8(a), the lateral velocity of the turning-left object does not fall below the velocity threshold value Vth until time t2a, when the object almost finishes turning left. Thus, unnecessary activation may occur due to a delay in the determination to prohibit activation of the safety device 30.

Figure 9:
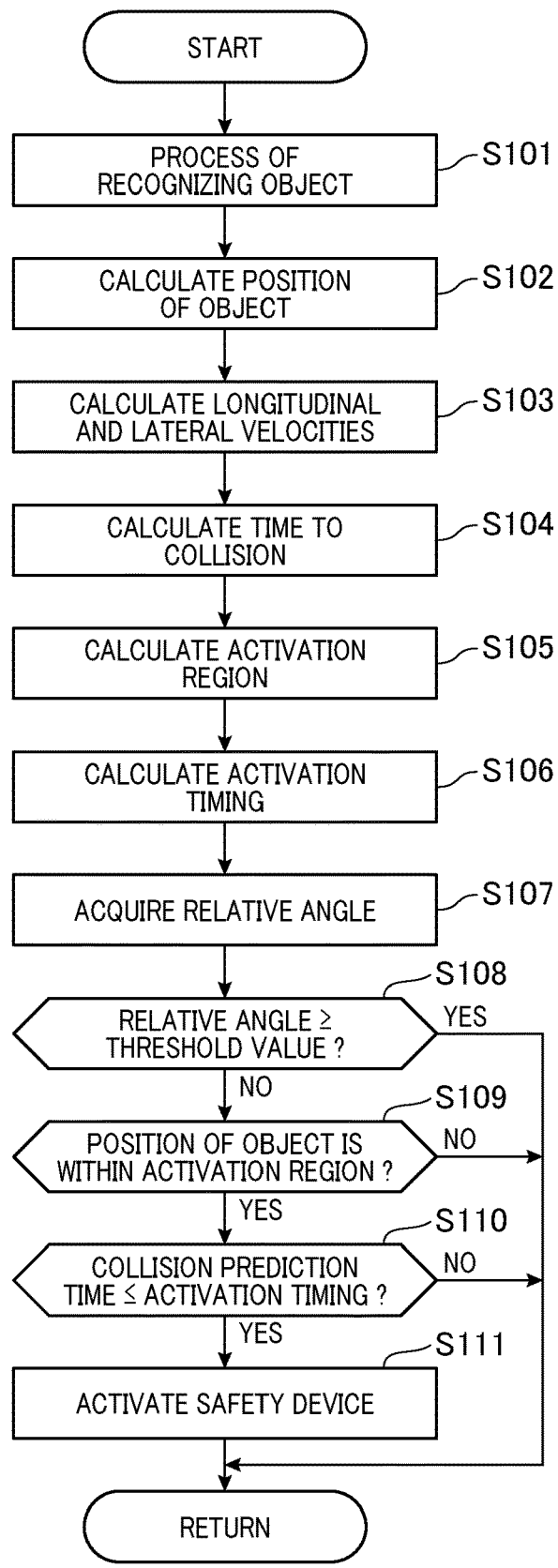
FIG. 9 is a flowchart illustrating a process that is executed by the vehicle control apparatus.

A control method, i.e., a series of processes that is executed by the vehicle control apparatus 10 configured as mentioned above, will be described using the flowchart of FIG. 9. The flowchart shown in FIG. 9 is repeatedly executed at predetermined control intervals.

First, the information acquiring unit 11 acquires pieces of detection information from the measuring device 21 and the imaging device 22, performs the process of recognizing an object (S101), calculates the position of each object (S102), and calculates the longitudinal and lateral velocities (S103). The time to collision calculating unit 12 then calculates the time to collision based on the position and longitudinal velocity (S104). In addition, the region setting unit 13 calculates the activation region (S105), and the activation timing setting unit 14 calculates the activation timing (S106).

Next, the angle acquiring unit 16 acquires the angle of the moving direction of the object relative to the moving direction of the vehicle based on the image acquired from the imaging device 22 (S107). The restricting unit 17 determines whether the relative angle is equal to or less than the threshold value (S108). If the relative angle is equal to or less than the threshold value (YES in S108), the moving direction of the object is substantially parallel to the moving direction of the vehicle, and thus the series of processes is terminated without activating the safety device 30.

If the relative angle is not equal to or less than the threshold value (NO in S108), the restricting unit 17 determines whether the position of the object is within the activation region (S109). If the position of the object is within the activation region (YES in S109), since one condition for activating the safety device 30 is satisfied, the restricting unit 17 subsequently determines whether the time to collision falls to or below the activation timing (S110). If the time to collision is equal to or less than the activation timing (YES in S110), since both conditions for activating the safety device 30 are satisfied, the activation determining unit 15 activates the safety device 30 (S111), and the series of processes is terminated. In contrast, if the position of the object is not within the activation region (NO in S109), or if the time to collision is not equal to or less than the activation timing (NO in S110), since at least one of the conditions for activating the safety device 30 is not satisfied, the series of processes is terminated without activating the safety device 30.

The above example indicates that the control executed by the vehicle control apparatus 10 according to the present embodiment is applied to a situation where the object moving from the forward left side of the vehicle at the orthogonal angle relative to the moving direction of the vehicle turns left before entering the course of the vehicle. However, the control executed by the vehicle control apparatus 10 according to the present embodiment is also effective in other situations. For example, the control executed by the vehicle control apparatus 10 according to the present embodiment can also be applied to a situation where the object traveling at the same angle as the vehicle on the forward left side of the vehicle gradually approaches the side position of the vehicle.

Owing to the above configuration, the vehicle control apparatus 10 according to the present embodiment achieves the following effects.

An object moving to cross the course of the vehicle can be distinguished from an object that is unlikely to cross the course of the vehicle using the relative angle between the moving direction of the vehicle and the moving direction of the object. Since the safety device 30 is not activated against the object that is unlikely to cross the course of the vehicle, unnecessary activation of the safety device 30 against the object that is highly likely not to cross the course of the vehicle can be prevented while inactivation of the safety device 30 against the object that is highly likely to cross the course of the vehicle can be prevented.

Second Embodiment

The overall configuration of the vehicle control apparatus 10 according to the present embodiment is equivalent to that of the vehicle control apparatus 10 according to the first embodiment, and part of the process executed by the angle acquiring unit 16 is different from that described in the first embodiment.

In the case where it is determined whether the object is to cross the course of the vehicle using the relative angle as in the first embodiment, the tendency of change in the moving direction of the object cannot be obtained while the moving direction of the object can be obtained.

In this regard, in the present embodiment, the relative angle between the moving direction of the vehicle and the moving direction of the object is acquired, and the change in the relative angle per time is calculated, so that the amount of change is also acquired as angle information. Note that, as described in the first embodiment, relative angles are acquired based on images of the object at predetermined intervals. Therefore, the time remaining until a certain relative angle changes to a different relative angle is measured, and the difference between the relative angles is divided by the time. Note that the change in the relative angle per time can be referred to as the amount of change.

Then, if the relative angle is equal to or less than the angle threshold value θth, and if the change in relative angle is also equal to or less than a negative change threshold value Δθth that is a threshold value of the change in relative value, that is, if the negative change in relative angle is equal to or larger than a predetermined amount, activation of the safety device 30 is prohibited since the object is considered to be unlikely to enter the course of the vehicle.

Figure 10:
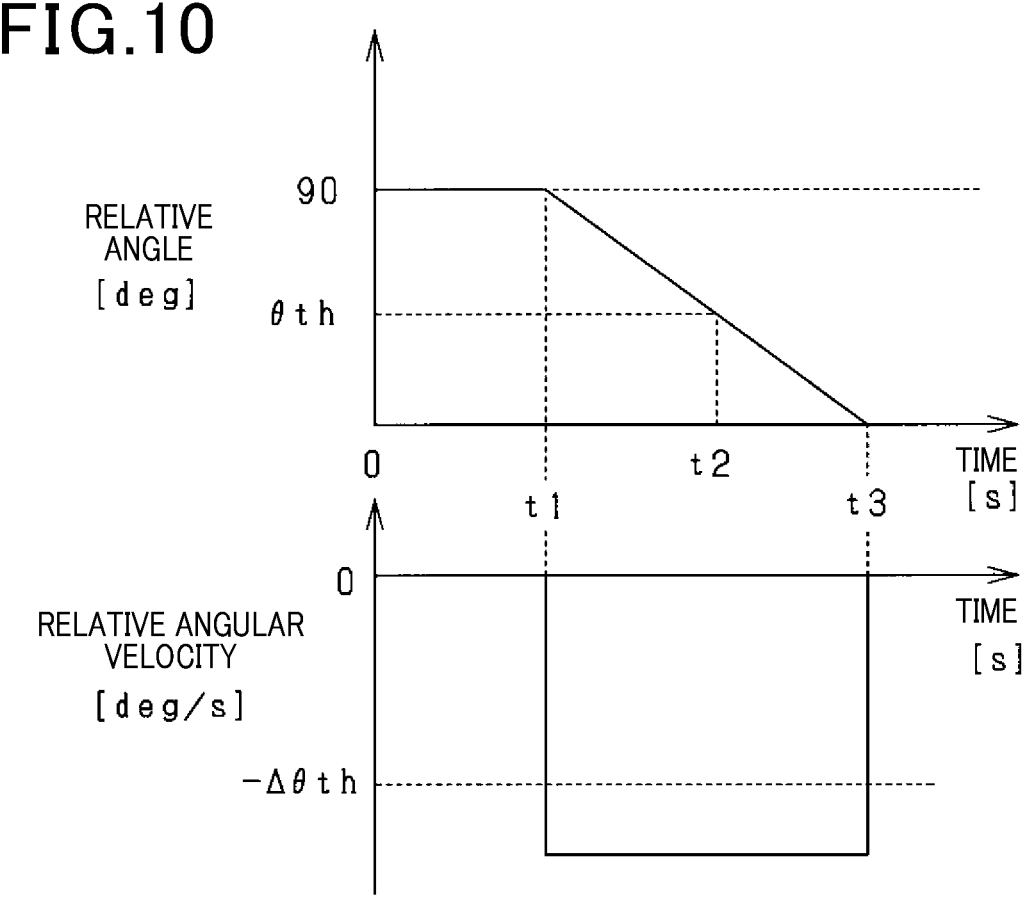
FIG. 10 is a timing diagram for performing a process according to a second embodiment.

A process that is executed by the vehicle control apparatus 10 according to the present embodiment will be described using the time chart of FIG. 10. The object running on the forward left side of the vehicle starts to turn left at time t1, and the relative angle decreases from 90°. Therefore, the calculated temporal change in relative angle is negative. After that, the relative angle falls to or below the angle threshold value θth at time t2, when the temporal change in angle is equal to or less than the change threshold value Δθth. Thus, activation of the safety device 30 is prohibited.

Note that if the relative angle is equal to or less than a predetermined value smaller than the angle threshold value θth, the moving direction of the vehicle is considered to be substantially parallel to the moving direction of the object. At this time, the vehicle is no longer likely to collide with the object, and it is highly likely that the driver of the vehicle is aware of the presence of the object, irrespective of whether the change in relative angle is smaller than the change threshold value Δθth. Therefore, if the relative angle falls to or below the predetermined value smaller than the angle threshold value θth, activation of the safety device 30 may be prohibited regardless of the temporal change in relative angle.

Owing to the above configuration, the vehicle control apparatus 10 according to the present embodiment achieves the following effects in addition to the effects of the vehicle control apparatus 10 according to the first embodiment.

In addition to the relative angle between the moving direction of the vehicle and the moving direction of the object, the change in relative angle per time is further used for determining whether to prohibit activation of the safety device 30. Therefore, the tendency of change in relative angle can be determined. Consequently, activation of the safety device 30 can be prevented only when the relative angle changes such that the moving direction of the object becomes substantially parallel to the moving direction of the vehicle. Thus, inactivation of the safety device 30 against the object that is highly likely to enter the course of the vehicle can be prevented while unnecessary activation of the safety device 30 against the object that is unlikely to enter the course of the vehicle can be prevented.

Third Embodiment

The overall configuration of the vehicle control apparatus 10 according to the present embodiment is equivalent to that of the vehicle control apparatus 10 according to the first embodiment, and part of the process executed by the angle acquiring unit 16 and part of the process executed by the activation determining unit 15 are different from those described in the first embodiment.

Figure 11:
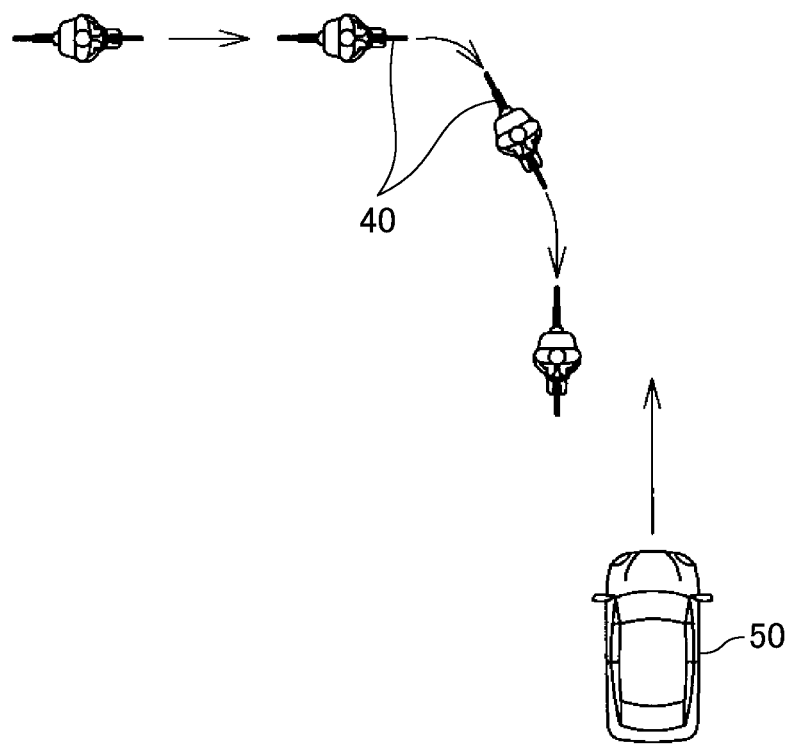
FIG. 11 is a diagram illustrating another example in which the object turns immediately before entering the course of the vehicle.

As shown in FIG. 11, the object moving from the forward left side of the vehicle at the orthogonal angle relative to the moving direction of the vehicle may turn right before entering the course of the vehicle and move in the opposite direction of the vehicle. In this case, activation of the safety device 30 against the object is unnecessary activation as in the case described above.

In this regard, in order to exclude objects that turn right before entering the course of the vehicle from targets for activation of the safety device 30, the vehicle control apparatus 10 sets threshold values for the relative angle and the change in relative angle per time. In the case where the object approaching the course of the vehicle from the left side of the vehicle turns right, the relative angle between the moving direction of the vehicle and the moving direction of the object increases. Therefore, a first threshold value θth1 larger than 90° and smaller than 180° is set as the threshold value for the relative angle, and if the relative angle rises to or above the first threshold value θth1, activation of the safety device 30 against the object is prohibited.

The present embodiment is similar to the first embodiment in that the object that turns left after approaching the course of the vehicle from the left side of the vehicle is excluded from targets for activation of the safety device 30. Therefore, in addition to the first threshold value θth1, a second threshold value θth2 larger than 0° and smaller than 90° is also provided, and if the relative angle is equal to or less than the second threshold value θth2, activation of the safety device 30 is prohibited. The second threshold value θth2 is similar to the angle threshold value θth according to the first embodiment. In other words, if the relative angle is larger than the second threshold value θth2 and smaller than the first threshold value θth1, the object is recognized as a target for activation of the safety device 30.

In addition, a threshold value is also provided for the temporal change in relative angle as in the second embodiment. As described above, in the case where the object approaching the course of the vehicle from the left side of the vehicle turns right, the relative angle increases. Therefore, a positive change threshold value Δθth is provided as the threshold value of the temporal change in relative angle. Since the relative angle of the turning-left object decreases as in the second embodiment, a negative change threshold value Δθth is also provided.

In this manner, the threshold values are provided for the relative angle and the temporal change in relative angle, and if both the condition that the relative angle is equal to or larger than the first threshold value θth1 and condition that the temporal change in relative angle is equal to or larger than the positive threshold value are satisfied, the safety device 30 is not activated. Similarly, if both the condition that the relative angle is equal to or less than the second threshold value and condition that the temporal change in relative angle is equal to or less than the change threshold value Δθth are satisfied, the safety device 30 is not activated. This is because even when the relative angle is equal to or larger than the first threshold value θth1, if the temporal change in relative angle is smaller than the negative change threshold value Δθth, the object is highly likely to stop turning right and move to cross the course of the vehicle. Similarly, even when the relative angle is equal to or less than the second threshold value θth2, if the temporal change in relative angle is larger than the positive change threshold value Δθth, the object is highly likely to stop turning left and move to cross the course of the vehicle.

Note that if the relative angle is equal to or larger than a predetermined value larger than the first threshold value θth1 and equal to or less than a predetermined value smaller than the second threshold value θth2, the moving direction of the vehicle is considered to be substantially parallel to the moving direction of the object. Therefore, if one of these conditions is satisfied, activation of the safety device 30 may be prohibited regardless of the temporal change in relative angle.

Figure 12:
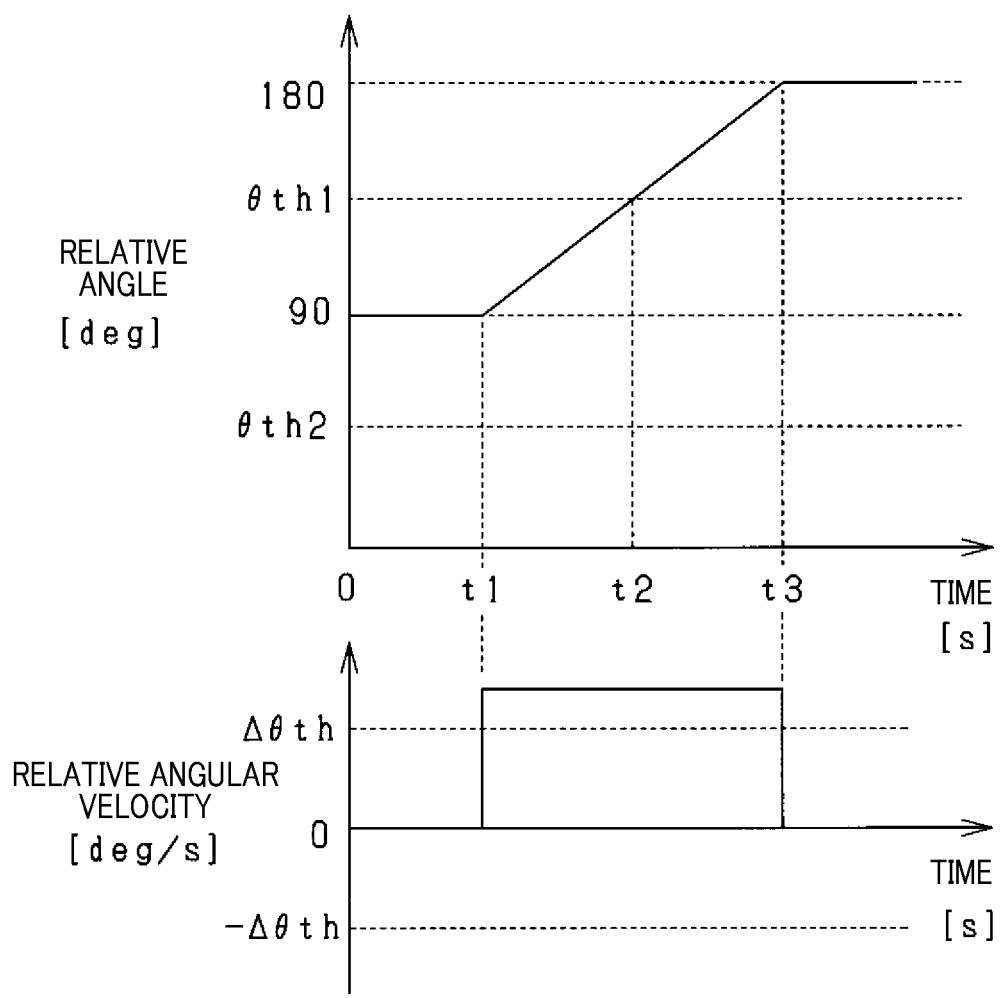
FIG. 12 is a timing diagram for performing a process according to a third embodiment.

FIG. 12 is a timing diagram for the case where the vehicle control apparatus 10 according to the present embodiment executes control. The object starts to turn right at time t1, and the relative angle increases as time elapses, and reaches the first threshold value θth1 at time t2. Thus, activation of the safety device 30 is prohibited at time t2, and unnecessary activation of the safety device 30 can be prevented. The object continues turning right, and the relative angle reaches 180° at time t3, which means that the vehicle and the object move in opposite directions. Note that a timing diagram for the case where the object turns left is equivalent to that described in the second embodiment, and the description thereof is omitted.

Owing to the above configuration, the vehicle control apparatus 10 according to the present embodiment achieves the following effects in addition to the effects of the vehicle control apparatus 10 according to the first embodiment and the effects of the vehicle control apparatus 10 according to the second embodiment.

The second threshold value θth2 larger than 0° and smaller than 90° and the first threshold value θth1 larger than 90° and smaller than 180° are provided as the threshold values of the relative angle. Consequently, it can be determined that the object turns in the same direction as the vehicle or turns in the opposite direction of the vehicle before entering the course of the vehicle.

If both the condition that the relative angle is equal to or less than the second threshold value θth2 larger than 0° and smaller than 90° and the condition that the change in relative angle per time is smaller than the negative change threshold value Δθth are satisfied, activation of the safety device 30 is restricted. Consequently, activation of the safety device 30 can be prevented from being suppressed when the object moving substantially in the same direction as the vehicle turns in the direction crossing the course of the vehicle. Therefore, both inactivation and unnecessary activation of the safety device 30 can be suppressed.

If both the condition that the relative angle is equal to or larger than the second threshold value θth2 larger than 90° and smaller than 180° and condition that the change in relative angle per time is larger than the positive threshold value are satisfied, activation of the safety device 30 is restricted. Consequently, activation of the safety device 30 can be prevented from being suppressed when the object moving substantially in the opposite direction of the vehicle turns in the direction crossing the course of the vehicle. Therefore, both inactivation and unnecessary activation of the safety device 30 can be suppressed.

Fourth Embodiment

The configuration of a vehicle control apparatus 10a according to the present embodiment is partially different from that of the vehicle control apparatus 10 according to the first to third embodiments. Specifically, activation of the safety device 30 is restricted by changing the width of the activation region shown in FIG. 2 instead of by prohibiting activation of the safety device 30 in accordance with the relative angle between the moving direction of the vehicle and the moving direction of the object and the change in relative angle per time.

FIG. 13(a) is a block diagram illustrating the hardware of the vehicle control apparatus 10a according to the present embodiment, and FIG. 13(b) is a functional block diagram. The angle acquiring unit 16 acquires the relative angle between the vehicle and the object as in the first embodiment. The angle acquiring unit 16 then inputs the relative angle to a restricting unit 17a. The restricting unit 17a performs determination in a manner equivalent to that described in any of the first to third embodiments, and inputs the result of determination to a region setting unit 13a. The region setting unit 13a corrects the width of the activation region based on the acquired relative angle.

Figure 14:
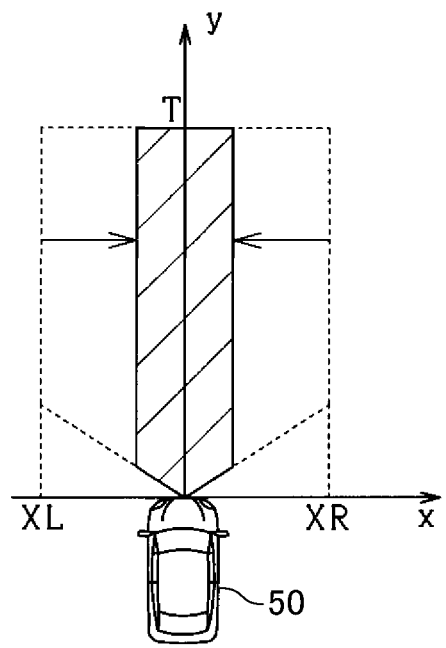
FIG. 14 is a diagram illustrating a process that is executed by the vehicle control apparatus according to the fourth embodiment.
Figure 15:
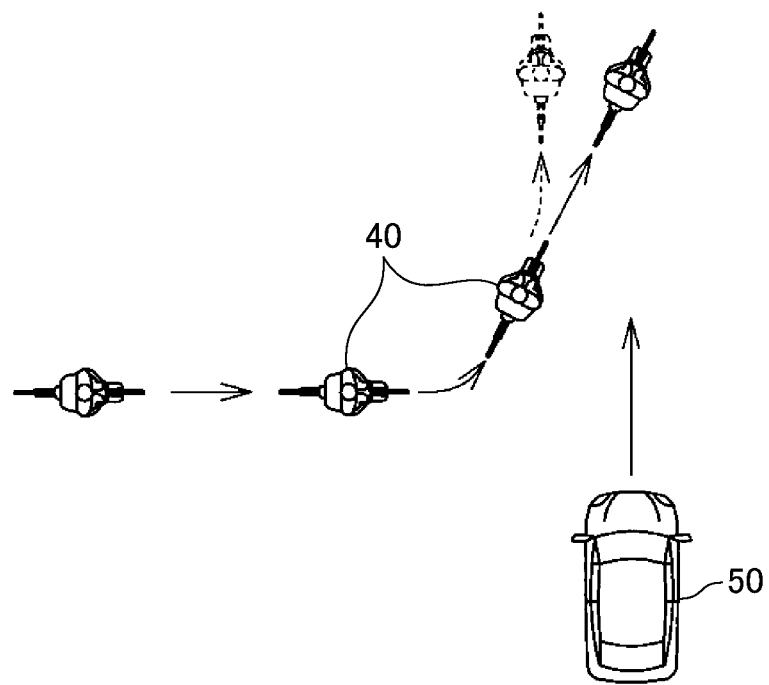
FIG. 15 is a diagram for explaining a situation where the process according to the fourth embodiment is particularly effective.

The activation region will be described using FIG. 14. In FIG. 14, an uncorrected activation region is indicated by the broken line, and a corrected activation region is indicated by the solid line. Specifically, the width of the activation region is corrected to a vehicle width. Owing to such a change in the width of the activation region, as shown in FIG. 15, the object 40 that enters the course of the vehicle 50 while turning in the same direction as the vehicle 50 can be recognized as a target for activation of the safety device 30.

Figure 16:
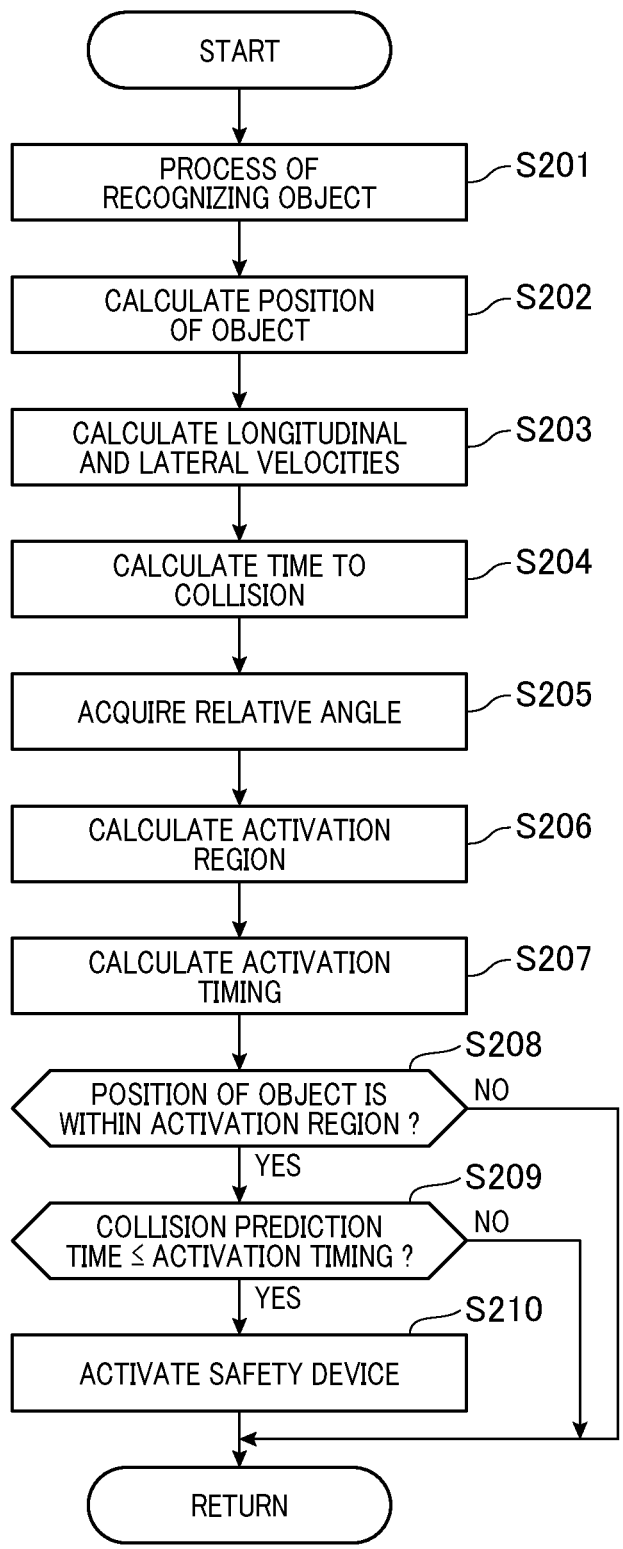
FIG. 16 is a flowchart illustrating a process that is executed by the vehicle control apparatus according to the fourth embodiment.

A control method, which is a series of processes executed by the vehicle control apparatus 10a configured as mentioned above, will be described using the flowchart of FIG. 16. The flowchart shown in FIG. 16 is repeatedly executed at predetermined control intervals.

First, processes similar to those of S101 to S105 according to the first embodiment are performed in S201 to S205. Next, the region setting unit 13 calculates the activation region based on the acquired relative angle (S206). The activation timing setting unit 14 then calculates the activation timing (S207). After the activation region and activation timing are calculated, the restricting unit 17 determines whether the position of the object is within the activation region (S208). If the position of the object is within the activation region (YES in S208), since one condition for activating the safety device 30 is satisfied, the restricting unit 17 subsequently determines whether the time to collision falls to or below the activation timing (S209). If the time to collision is equal to or less than the activation timing (YES in S209), since both conditions for activating the safety device 30 are satisfied, an activation determining unit 15a activates the safety device 30 (S210), and the series of processes is terminated. In contrast, if the position of the object is not within the activation region (NO in S208), or if the time to collision is not equal to or less than the activation timing (NO in S209), since at least one of the conditions for activating the safety device 30 is not satisfied, the series of processes is terminated without activating the safety device 30.

Note that the width of the activation region may be changed in a stepwise manner, not in a binary manner. This can be achieved simply by providing a plurality of threshold values for the angle.

Owing to the above configuration, the vehicle control apparatus 10 according to the present embodiment achieves the following effects in addition to the effects of the vehicle control apparatus 10 according to the first to third embodiments.

Activation of the safety device 30 can be suppressed when the object moves in the same direction as or opposite direction of the vehicle on the diagonally forward side of the vehicle, and the object that enters the course of the vehicle while travelling in the same direction as or opposite direction of the vehicle can be recognized as a target for activation of the safety device 30. Therefore, both inactivation and unnecessary activation of the safety device 30 can be suppressed.

<Modification>

In the first embodiment, whether to activate the safety device 30 is determined using only the relative angle between the moving direction of the vehicle and the moving direction of the object, and in the second and third embodiments, whether to activate the safety device 30 is determined using the change in relative angle per time as well as the relative angle between the moving direction of the vehicle and the moving direction of the object. Alternatively, whether to activate the safety device 30 may be determined using only the change in relative angle per time without using the relative angle. In this case, the procedure only needs to include measuring the time during which the change in relative angle per time exceeds a threshold value, and prohibiting activation of the safety device 30 if the time is equal to or larger than a predetermined period of time.

In the embodiments, the relative angle between the moving direction of the vehicle and the moving direction of the object that cross each other at right angles is defined as 90°. However, the angle can be freely defined. For example, the relative angle between the moving direction of the vehicle and the moving direction of the object that cross each other at right angles may be defined as 0°. Such a change in the definition of the relative angle only needs to be followed by setting each threshold value in accordance with the definition. Specifically, according to the first embodiment, activation of the safety device 30 only needs to be restricted if one of the following conditions is satisfied: the relative angle is closer to the same angle than is the threshold value between the orthogonal and the same angles; and the relative angle is closer to the opposite direction angle than is a threshold value between the orthogonal and the opposite direction angles. According to the third embodiment, activation of the safety device 30 only needs to be restricted if the relative angle is closer to the same angle than is a threshold value between the orthogonal and the same angles, and if a change in the angle per time indicates that the relative angle is changing from the orthogonal to the same angle, or if the relative angle is closer to the opposite direction angle than is a threshold value between the orthogonal and the opposite direction angles, and if a change in the angle per time indicates that the relative angle is changing from the orthogonal to the opposite direction angle.

In the embodiments, the relative angle between the moving direction of the vehicle and the moving direction of the object is obtained in the range of 0° to 180°, namely, in the range of the same direction to the opposite direction. Alternatively, assuming that 0° indicates that the moving direction of the object is the same as or opposite to the moving direction of the vehicle, and 90° indicates that the moving direction of the object is orthogonal to the moving direction of the vehicle, the relative angle may be obtained in the range of 0° to 90°. In this case, activation of the safety device 30 can be restricted if the relative angle is equal to or less than a predetermined acute angle. The application of this alternative to the second and third embodiments only needs to include determining that the condition is satisfied if the relative angle decreases.

In the embodiments, the relative angle between the moving direction of the vehicle and the moving direction of the object is obtained on the basis of the image acquired by the imaging device 22. Alternatively, the relative angle can be obtained using another method. For example, the moving direction may be obtained from the historical positions of the object.

In the embodiments, the angle of the moving direction of the object relative to the moving direction of the vehicle is obtained. However, the relative angle does not necessarily have to be acquired. Specifically, template images for use in template matching may be used as angle information, and may be correlated with information about whether to restrict activation of the safety device 30, not with information indicating the relative angle. Note that, in this case, the relation between template images and information about whether to restrict activation of the safety device 30 can be referred to as the relation indicating an angle. Specifically, according to the first embodiment, activation of the safety device 30 only needs to be restricted if one of the following conditions is satisfied: the relative angle is closer to the same angle than is a predetermined angle between the orthogonal and the same angles is; and the relative angle is closer to the opposite direction angle than is a predetermined angle between the orthogonal and the opposite direction angles. According to the third embodiment, activation of the safety device 30 only needs to be restricted if the relative angle is closer to the same angle than is a predetermined angle between the orthogonal and the same angles, and if a change in the angle per time indicates that the relative angle is changing from the orthogonal to the same angle, or if the relative angle is closer to the opposite direction angle than is a predetermined angle between the orthogonal and the opposite angles is, and if a change in the angle per time indicates that the relative angle is changing from the orthogonal to the opposite direction angle.

In the embodiments, the object is exemplified by a bicycle. However, the present disclosure can be similarly applied to mobile bodies around the vehicle such as pedestrians, motorcycles, and automobiles.

In the embodiments, the vehicle control apparatus 10 is configured to be mounted to the vehicle. However, the vehicle control apparatus 10 does not necessarily have to be mounted to the vehicle, but can be mounted to various types of mobile bodies.

The present disclosure is described with reference to the examples, but it will be understood that the present disclosure is not limited to the examples or configurations. The present disclosure encompasses various modified examples and variations within an equal range. In addition, a category or range of thought of the present disclosure encompasses various combinations or forms and other combinations or forms including only one element, one or more elements, or one or less elements of those.

PARTIAL REFERENCE SIGNS LIST

10 . . . Vehicle control apparatus
13a . . . Region setting unit
15 . . . Activation determining unit
17 . . . Restricting unit
17a . . . Restricting unit

The invention claimed is:
1. A moving object control apparatus that activates, as a safety device, a device that avoids a collision between a moving object and an object present ahead of the moving object in a moving direction of the moving object or reduces damage from a collision when the moving object is likely to collide with the object, the moving object control apparatus comprising:
an obtaining unit that obtains a relative angle of a moving direction of the object relative to the moving direction of the moving object;
a calculating unit that calculates a change in the relative angle per time;

a first determining unit that determines that the relative angle is equal to or less than a predetermined threshold value;

a second determining unit that determines that an amount of a negative change in the relative angle per time calculated by the calculating unit is equal to or more than a predetermined amount; and a restricting unit that restricts activation of the safety device upon the relative angle being determined to be equal to or less than the threshold value and the amount of the negative change in the relative angle per time being determined to be equal to or more than the predetermined amount.

2. The moving object control apparatus according to claim 1, wherein the restricting unit restricts activation of the safety device regardless of the negative change in the angle per time upon the relative angle being determined to be equal to or less than a second threshold value that is smaller than the first threshold value.

3. The moving object control apparatus according to claim 1, wherein the restricting unit restricts activation by prohibiting activation of the safety device.

4. The moving object control apparatus according to claim 1, further comprising:

a region setting unit that sets a region having a predetermined width ahead of the moving object in the moving direction; and an activation determining unit that recognizes the object located within the region as a target for activation of the safety device, wherein the restricting unit restricts activation by reducing the width of the region.

5. A method of controlling a moving object that is executed by a moving object control apparatus that activates, as a safety device, a device that avoids a collision between a moving object and an object present ahead of the moving object in its moving direction or reduces damage from a collision when the moving object is likely to collide with the object, the method comprising:

obtaining a relative angle of the moving direction of the object relative to the moving direction of the moving object;

calculating a change in the relative angle per time;

determining that the relative angle is equal to or less than a predetermined threshold value;

determining that an amount of a negative change in the relative angle per time calculated by the calculating unit is equal to or more than a predetermined amount;

restricting activation of the safety device upon the relative angle being determined to be equal to or less than the threshold value and the amount of the negative change in the relative angle per time being determined to be equal to or more than the predetermined amount.

6. The method of claim 5, further comprising restricting activation of the safety device regardless of the negative change in the angle per time upon the relative angle being determined to be equal to or less than a second threshold value that is smaller than the first threshold value.

7. The method of claim 5, wherein restricting activation comprises prohibiting activation of the safety device.

8. The method of claim 5, further comprising:

setting a region having a predetermined width ahead of the moving object in the moving direction; and recognizing the object located within the region as a target for activation of the safety device, wherein restricting activation comprises reducing the width of the region.

* * * * *